United States Patent [19]
Jörlöv

[11] Patent Number: 5,189,555
[45] Date of Patent: Feb. 23, 1993

[54] PARALLAX FREE OPTICAL SIGHTING DEVICE

[75] Inventor: Rickard Jörlöv, Lomma, Sweden

[73] Assignee: Aimpoint AB, Malmo, Sweden

[21] Appl. No.: 521,151

[22] Filed: May 8, 1990

[30] Foreign Application Priority Data

May 10, 1989 [SE] Sweden .............................. 8901657

[51] Int. Cl.⁵ ..................... G02B 17/00; G02B 23/10; F41G 3/00
[52] U.S. Cl. ..................... 359/618; 359/727; 356/247; 356/251; 33/233
[58] Field of Search ..................... 350/560–562, 350/550, 315, 174; 356/251–252, 247–255, 123; 250/467.1, 227.11; 33/234, 241–259; 273/312; 359/503–506; 307/64, 66, 86

[56] References Cited

U.S. PATENT DOCUMENTS

| | | | |
|---|---|---|---|
| 3,942,901 | 3/1976 | Ekstrand | 356/252 |
| 3,963,356 | 6/1976 | Wiklund | 33/241 |
| 4,118,126 | 10/1978 | Noble | 356/123 |
| 4,346,995 | 8/1982 | Morris | 356/251 |
| 4,402,605 | 9/1983 | Ekstrand | 356/252 |
| 4,665,622 | 5/1987 | Idan | 356/252 |
| 4,743,765 | 5/1988 | Ekstrand | 250/467.1 |
| 4,804,858 | 2/1989 | Jörlöv et al. | 250/206 |
| 4,830,381 | 5/1989 | Sellner | 273/312 |
| 4,859,058 | 8/1989 | Ekstrand | 356/251 |
| 4,940,324 | 7/1990 | Nichols | 356/251 |
| 4,945,646 | 8/1990 | Ekstrand | 356/251 |

Primary Examiner—Bruce Y. Arnold
Assistant Examiner—Thong Nguyen
Attorney, Agent, or Firm—Merchant, Gould, Smith, Edell, Welter & Schmidt

[57] ABSTRACT

A parallax free sight which utilizes a concave-convex lens with a parabolic shaped optical surface attached to one end of a light channel, the concave side of the lens faces into the light channel, the perimeter dimensions of the lens is adapted to the rectangular shape and dimensions of the light channel, with the longer sides of the rectangular lens perimeter positioned in a horizontal plane when the sight is in use. A transparent body is attached to the other end of the light channel. A light emitting source is arranged at the focal point of the concave side of the lens, between the lens and the transparent body. The light source can be a light emitting material or an electrical light source, powered by a rechargeable battery or a solar cell, or both. A light reflective layer is attached to the concave side of the lens to only reflect light of the wavelengths corresponding to the light emitted by the light emitting source.

9 Claims, 4 Drawing Sheets

PARALLAX FREE OPTICAL SIGHTING DEVICE

BACKGROUND OF THE INVENTION

This invention relates to a parallax free sight, comprising an elongated light channel, with a concave-convex lens attached to one end of the light tunnel. On the concave side, there is a layer reflecting light of certain wave lengths. A transparent body is attached to the other end of the light channel, and a light emitting means is arranged in the focal point of the concave part of the lens between said lens and the transparent body. The light channel is intended to follow movements of an object to be aimed at by said sight.

Different types of optical fire arms sights are frequently utilized in both hunting and military applications to improve targeting accuracy. The most frequently used type are telescopic sights, provided with a cross-hair in the lens system, which comprises a tube or a light channel. However, recently parallax free sights or reflex sights, which preferably do not enlarge the image, and have aiming marks shaped as a spot or a ring have become more common. A major advantage with the latter type and sight is that the aiming spot does not have to be centered in the sight when aiming the sight and weapon. Thus, the aiming step is more rapid and safe. Another large advantage, is that the sight does not enlarge. Only one eye has to be directed through the sight while the other can be kept open and directed also towards the target or target area, whereby the gunner increases substantially the general view of the target area.

Sights free of parallax are based on the principal of a concave-convex lens having a semi-reflective layer on the concave side of the lens. The sight is arranged to be moved with and adjustable to the barrel of the fire arm, said concave and reflecting side of the lens being directed towards the eye of the gunner. Normally the sight is mounted on a rail on the barrel and adjustable by means of adjustment screws or the like. The lens is also mounted in relation to the sight line of the gunner through the lens so that the focal point of the semi-reflective layer on the concave side of the lens is somewhat below the sight line. A light beam is directed at the aiming mark so that it is reflected off the lens in the direction of the eye of the gunner. The light beams reflected from the semi-reflective layer are parallel due to the construction of the lens. The aiming mark appears to the gunner as distant or at infinity. As the target normally is also distant from the gunner, both the target and the aiming mark can be focused at the same time, whereby the gun is readily and accurately directed towards the target. This type of sight is disclosed in the U.S. Pat. No. 4,346,995.

Previously used lenses, e.g., according to the above-mentioned patent, were normally provided with spherical shaped optical surfaces resulting in an optical error in the lens, in the form of a relatively large spherical aberration. To some extent, this type of error can be compensated by using so-called double lenses which during some ideal circumstances may give a reflection free from said error. Due to the fact that the lens in practice is always arranged at an angle other than a right angle in relation to the sight line, some spherical aberration still remains, even with double lenses.

In the military area and also in the hunting area the most common targets, which are not stationary, move horizontally. Sights according to previously known technique having circular cross section are thus constructed with a large radius so as to accomplish an acceptable aiming area in the horizontal direction. Thereby such sights are comparatively large and, as the aiming mark is arranged in or close to the center of the sight, the distance or offset between the sightline and the shooting line is large, which is disadvantageous. A large distance results, if the gun is inclined so that a line between the sightline and the shooting line differs from a vertical line, in that the calibration in relation to the actual trajectory will not be correct.

To achieve as large a contrasting effect as possible between the aiming mark and target, the aiming mark is illuminated, normally by a light emitting diode or a similar device. Other types of luminous aiming marks comprise illuminous material.

As guns suitable for this type of sight are indeed portable, the supply of power to the light emitting diode causes some problems. Normal types of batteries are of course used, but in reality such batteries are either small and have low capacity or are large and are difficult to place, as well as being heavy. The batteries must be well protected against rain and moisture and should also be easy to replace. These two features are difficult to combine.

Rechargeable batteries are also used, but the state of charge of such batteries must be checked carefully before the sight is used so that the function of the sight has not deteriorated due to use. Any charging of the battery must be taken care of before using the sight, while practical problems exist when charging in connection with the actual use of the sight.

SUMMARY OF THE INVENTION

To overcome the above-mentioned problems and difficulties there is provided according to the present invention a parallax free sight, comprising a casing having a rectangular cross section forming an elongated light channel. A concave-convex lens with a parabolic shaped optical surface is attached to one end of the light channel, the concave side of the lens facing into the light channel. The perimeter dimensions of the lens are adapted to the rectangular shape and dimensions of the light channel, the longer sides of the rectangular lens perimeter is positioned in a horizontal plane when the sight is in use. An electrical light emitting element is arranged at the focal point of a semi-reflective mirror surface which is provided on the concave side of the lens inside the light channel. A battery contained within a protected space is connected to the light emitting element. At least one solar cell on an outside surface of the casing is provided, the solar cell being electrically connected to the electrical light emitting element.

BRIEF DESCRIPTION OF THE DRAWINGS

The invention will now be described in more detail by means of an embodiment with reference to the accompanying drawings, in which:

FIG. 8B is a ring shaped light emitting means.

DETAILED DESCRIPTION OF THE PREFERRED EMBODIMENT

Figure 1:
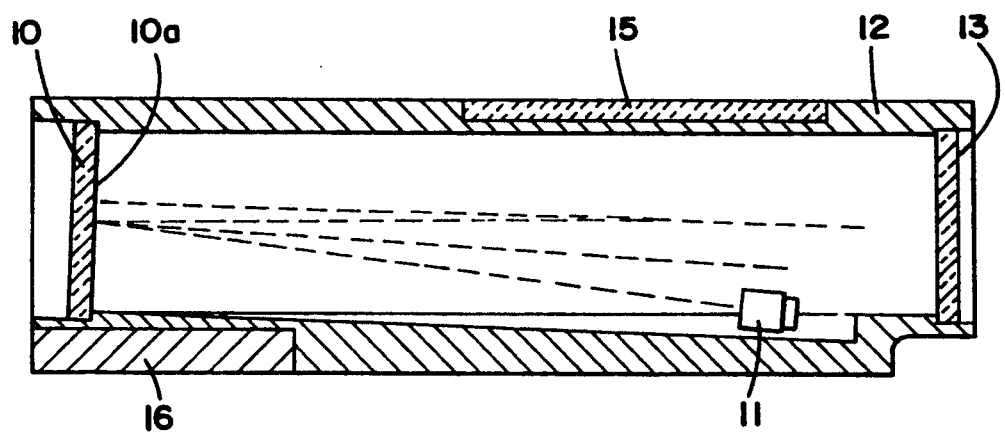
FIG. 1 is a longitudinal cross section of a sight according to the invention.
Figure 8C:
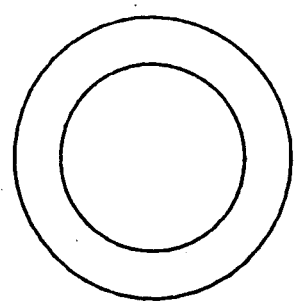
FIG. 8A illustrates a cross shaped light emitting means.
FIG. 8B illustrates a bar-shaped light emitting means.
Figure 8B:
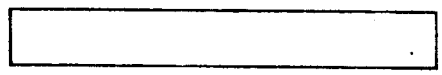
Figure 8A:
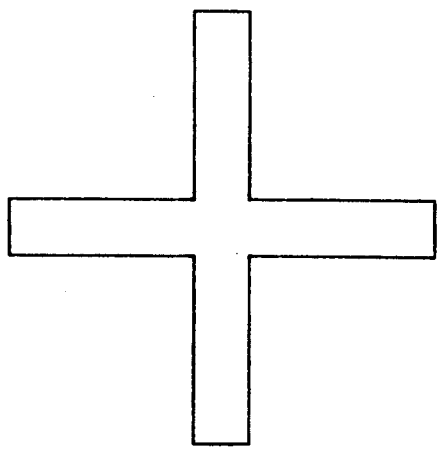

The sight according to FIG. 1 comprises a rectangular and parabolically formed concave-convex lens 10, which is attached in a light channel shaped as a tube 12 having rectangular cross section. The lens is attached close to one end of said light channel. At the other end of the light channel is attached a transparent body 13, which is directed towards the eye of the gunner. Also, the body is rectangular. The tube 12 is provided with fastening means 16 for mounting the sight on a gun, preferably on the barrel of the gun. The side of the lens directed towards the transparent body 13 is parabolically shaped. The lens is mounted in the light channel in such a way that the focal point thereof falls inside of the light channel between the lens 10 and the transparent body 13, below the center line of the light channel. The center line of the light channel is defined as the sight line. In said focal point, there is provided a light emitting means, which constitutes the aiming point, formed as a light emitting diode 11. In some embodiments of the invention the light emitting diode is formed as a ring, while in others the light emitting diode is replaced by an optical fiber, one end thereof opening into the focal point, and the second end thereof being supplied with light, e.g., from a light emitting diode. In one embodiment the lens is cut to parabolic shape while in another embodiment it is produced directly in this shape. Three possible configurations of the aiming point are illustrated in FIGS. 8A-8C.

The parabolic surface of the lens 10 is coated with a partially reflecting layer 10a. In this embodiment the layer is reflective to a certain narrow frequency, around the frequency 650 nm, i.e., red light only, while light of other frequencies passes through the lens substantially without reflection. The center frequency for reflection is of course chosen in dependence of the frequency of the light emitted from the light emitting means. The other side of the lens is cut, or produced, in such a way that it is completely neutral to the light passed through the lens.

Figure 2:
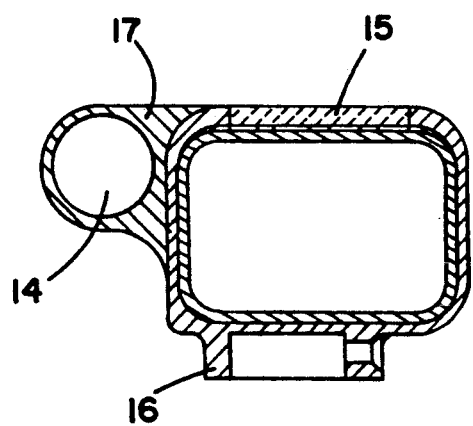
FIG. 2 is cross section of a sight according to the invention.
Figure 6:
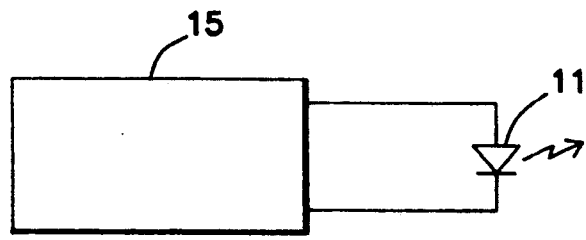
FIG. 6 illustrates the attachment of the light emitting diode directly to the solar cell.
Figure 7:
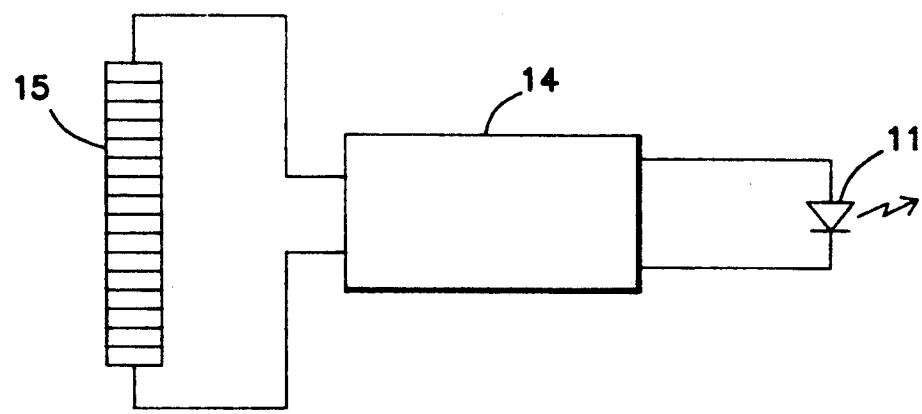
FIG. 7 illustrates the connection of the solar cells to the battery/switch unit.

To power the light emitting diode, a rechargeable battery switch unit 14 is provided, as is clear from FIG. 2, in a casing 17, projecting from the light channel. A switch not shown here is also provided between said battery and the light emitting diode. Because of the rectangular cross section of the light channel, the walls thereof are flat. Exterior on the upper side of the tube a flat solar cell 15 is flush-mounted, said solar cell supplying in this embodiment the battery with charging current. It is also possible that the solar cell directly, or occasionally through a buffer comprising, e.g., a capacitor, is connected to the light emitting diode, the battery in that case being redundant. FIG. 6 illustrates the solar cell 15 directly connected to the LED 11. As the flat upper side of the light channel is comparatively large, the space available for the solar cell is also large. Thus, a solar cell with a large surface area, having a high output, can be used. In the embodiment without a battery, it is a condition that the sight is used preferably outdoors and mostly in daylight. In the embodiment with a battery, the output of the solar cell is switched automatically between the battery and the light emitting diode, depending on the light falling on the solar cell. The battery/switch unit 14 of FIG. 7 allows the solar cell to power the LED directly or to charge the battery. In an embodiment not shown here the sight is arranged without a solar cell.

The lens can be molded completely in plastics directly to a rectangular shape, fastening and possibly sealing material can be embedded or attached to the lens material for the attachment in the light channel. Also, lenses made of glass can be used.

A sight substantially made in plastic material is advantageous as to weight and is convenient in many applications.

Figure 3:
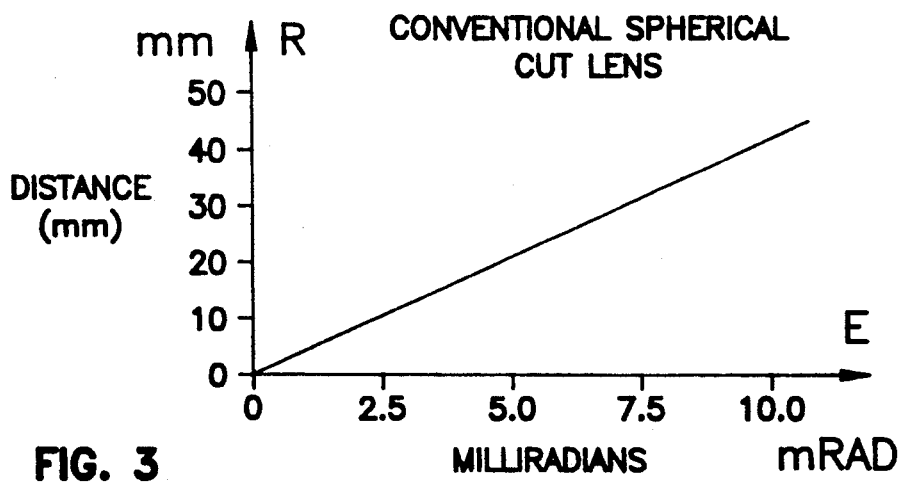
FIG. 3 is a graphic representation of the angular deviation of the target image in a sight according to prior art techniques at different points along a radius of the sight.
Figure 4:
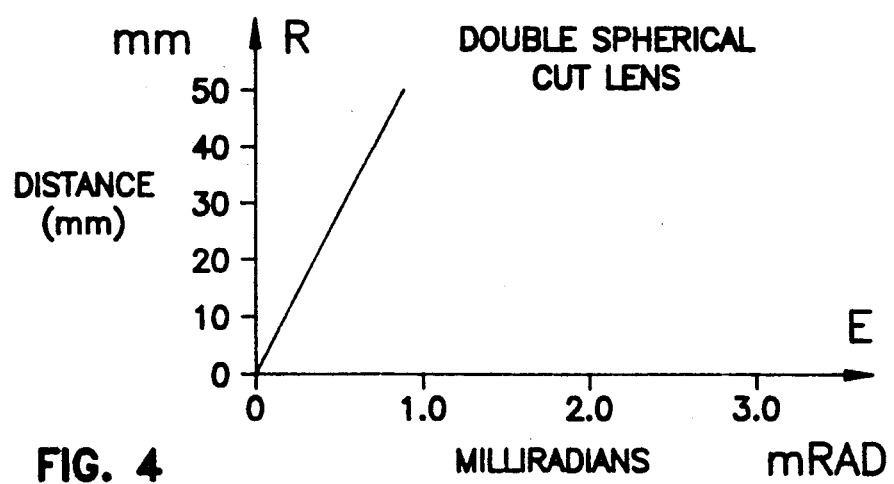
FIG. 4 is a graphic representation of the angular deviation of the target image in a sight at different points along a radius of the sight according to an alternative embodiment according to prior art techniques.
Figure 5:
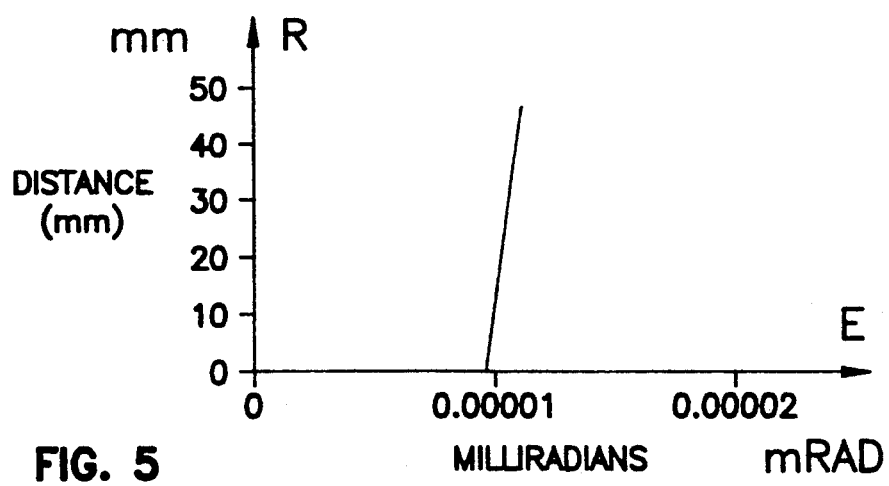
FIG. 5 is a graphic representation of the angular deviation of the target image in a sight according to the present invention, at different points along a radius of the sight.

The graphic representations of FIG. 3-FIG. 5 show the position of a point along the radius of the lens as a function of angular error or angular deviation existing in different types of sights. The angular deviation is defined as the angular deviation for each point of the target projected on the reflecting layer of the lens. The graphic representation of FIG. 3 relates to a conventional spherically cut lens, the y-axes specifying the position of the point along a radius of the lens starting from the optical center of the lens. The angular deviation is specified on the x-axes and is considered too large to be accepted.

The graphic representation of FIG. 4 relates to a conventional so called double-cut lens, and as is clear from the graph, considering especially the different scale of the x-axes, the improvement of the lens characteristics is substantial. However, the angular deviation is still too large to be all together sufficient.

The characteristics of a lens according to the present invention regarding the angular deviation is shown in FIG. 5. Please note the substantially enlarged scale of the x-axes of the graph. In this case the angular deviation can be neglected in all realistic circumstances.

I claim:

1. Parallax free sight, comprising:
    a casing having a rectangular cross section forming an elongated light channel;
    a concave-convex lens with a parabolic shaped optical surface attached to one end of said light channel, said concave side of said lens facing into said light channel, the perimeter dimensions of said lens being adapted to the rectangular shape and dimensions of said light channel, the longer sides of said rectangular lens perimeter positioned in a horizontal plane when the sight is in use;
    a semi-reflective mirror surface provided on said concave side of said lens, said semi-reflective mirror surface having a focal point;
    a transparent body attached to the other end of said light channel;

an electrical light emitting means arranged at said focal point of said semi-reflective mirror surface, said semi-reflective mirror surface reflecting light of a wave length corresponding to the light emitted by said light emitting means;

a battery contained within a protected space connected to said light emitting means; and at least one solar cell on an outside surface of said casing, said solar cell being electrically connected to said electrical light emitting means.

2. Parallax free sight according to claim 1, further wherein said solar cell supplies charging current to said battery.

3. Parallax free sight according to claim 1, wherein a power supply circuit is provided for the driving of said light emitting means, said power circuit being adjustable so as to control the intensity of the light emitted from said light emitting means.

4. Parallax free sight according to claim 1, wherein said light emitting means comprises a luminous material.

5. Parallax free sight according to claim 1, wherein said light emitting means is formed as a spot.

6. Parallax free sight according to claim 1, wherein said light emitting means comprises a plurality of spots mutually spaced along the periphery of a circle.

7. Parallax free sight according to claim 1, wherein said light emitting means is bar-shaped.

8. Parallax free sight according to claim 1, wherein said light emitting means is cross-shaped.

9. Parallax free sight, comprising:

a casing having a rectangular cross section forming an elongated light channel;

a concave-convex lens with a parabolic shaped optical surface attached to one end of said light channel, said concave side of said lens facing into said light channel, the perimeter dimensions of said lens being adapted tot he rectangular shape and dimension of said light channel, the longer sides of said rectangular lens perimeter positioned in a horizontal plane when the sight is in use;

a semi-reflective mirror surface provided on said concave side of said lens, said semi-reflective mirror surface having a focal point;

a transparent body attached to the other end of said light channel;

an electrical light emitting means arranged at the focal point of said semi-reflective mirror surface; and at least one solar cell on an outside surface of said casing, said solar cell being electrically connected to said electrical light emitting means.

* * * * *

UNITED STATES PATENT AND TRADEMARK OFFICE
CERTIFICATE OF CORRECTION

PATENT NO. : 5,189,555

DATED : February 23, 1993

INVENTOR(S) : Rickard Jörlöv

It is certified that error appears in the above-identified patent and that said Letters Patent is hereby corrected as shown below:

Column 3, line 18, "8B" should read --8C--

Column 3, line 62, insert --/-- after the word "battery"

Column 6, line 12, "tot he" should read --to the--

Column 6, line 12, "dimension" should read --dimensions--.

Signed and Sealed this

Eighth Day of February, 1994

Attest:

BRUCE LEHMAN

*Attesting Officer*     *Commissioner of Patents and Trademarks*